US008060927B2

(12) United States Patent
Engdahl et al.

(10) Patent No.: US 8,060,927 B2
(45) Date of Patent: Nov. 15, 2011

(54) SECURITY STATE AWARE FIREWALL

(75) Inventors: Christopher J. Engdahl, Seattle, WA (US); Brian Swander, Bellevue, WA (US); Lee Walker, Christiansburg, VA (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 11/981,427

(22) Filed: Oct. 31, 2007

(65) Prior Publication Data
US 2009/0113517 A1 Apr. 30, 2009

(51) Int. Cl.
*H04L 29/02* (2006.01)
*G06F 21/24* (2006.01)

(52) U.S. Cl. .................. 726/13; 713/154; 726/3

(58) Field of Classification Search .............. None
See application file for complete search history.

(56) References Cited

U.S. PATENT DOCUMENTS

| | | | |
|---|---|---|---|
| 6,061,798 A | 5/2000 | Coley et al. | |
| 6,182,226 B1 | 1/2001 | Reid et al. | |
| 6,496,935 B1 * | 12/2002 | Fink et al. | 726/13 |
| 6,874,090 B2 * | 3/2005 | See et al. | 726/13 |
| 6,981,155 B1 | 12/2005 | Lyle et al. | |
| 7,051,369 B1 | 5/2006 | Baba | |
| 7,095,716 B1 | 8/2006 | Ke et al. | |
| 7,161,904 B2 | 1/2007 | Hussain et al. | |
| 7,174,452 B2 * | 2/2007 | Carr | 713/151 |
| 7,809,128 B2 * | 10/2010 | Li et al. | 379/354 |
| 2003/0126468 A1 * | 7/2003 | Markham | 713/201 |
| 2004/0162992 A1 | 8/2004 | Sami et al. | |
| 2004/0172557 A1 | 9/2004 | Nakae et al. | |
| 2004/0187032 A1 | 9/2004 | Gels et al. | |
| 2005/0050364 A1 | 3/2005 | Feng | |
| 2005/0097350 A1 | 5/2005 | Patrick et al. | |
| 2005/0108531 A1 | 5/2005 | Swander et al. | |
| 2006/0136715 A1 * | 6/2006 | Han et al. | 713/151 |
| 2006/0233144 A1 * | 10/2006 | Matsumoto | 370/338 |
| 2007/0022479 A1 | 1/2007 | Sikdar et al. | |
| 2007/0079368 A1 | 4/2007 | Takeyoshi et al. | |

OTHER PUBLICATIONS

International Search Report and Written Opinion for PCT Application No. PCT/US2008/081120 dated Feb. 10, 2009.
Nortel Networks "Protecting the Enterprise Network: Layered Network Security Defense" May 20, 2004, 8 Pages.
"Security—Nortel Takes it to the Edge" Dec. 20, 2007, 5 pages.
Stefan Norberg, "Securing Windows NT/2000 Servers for the Internet" Nov. 2000, 28 pages.

* cited by examiner

*Primary Examiner* — Minh Dinh
*Assistant Examiner* — Venkat Perungavoor
(74) *Attorney, Agent, or Firm* — Russell S. Krajec; Krajec Patent Offices, LLC

(57) ABSTRACT

A network firewall may apply policies to packets based on a security classification. Packets with an authenticated and established security connection may be handled at a high throughput while packets with unauthenticated connections may be handed at a low throughput or even discarded. In some embodiments, three or more levels of security classifications may be used to process packets at different speeds or priorities. In some embodiments, one device may classify and tag each packet, while another device within the network may process the packets according to the tags.

18 Claims, 3 Drawing Sheets

SECURITY STATE AWARE FIREWALL

BACKGROUND

Network firewalls are devices that may be used to protect a network from malicious attacks or unwanted trespassers. A common type of attack is a denial of service attack. In a denial of service attack, a network may be compromised by a large number of communication requests that may overwhelm a network and cause the network to function slowly or not at all. Many other types of attacks have been attempted against network installations.

SUMMARY

A network firewall may apply policies to packets based on a security classification. Packets with an authenticated and established security connection may be handled at a high throughput while packets with unauthenticated connections may be handed at a low throughput or even discarded. In some embodiments, three or more levels of security classifications may be used to process packets at different speeds or priorities. In some embodiments, one device may classify and tag each packet, while another device within the network may process the packets according to the tags.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
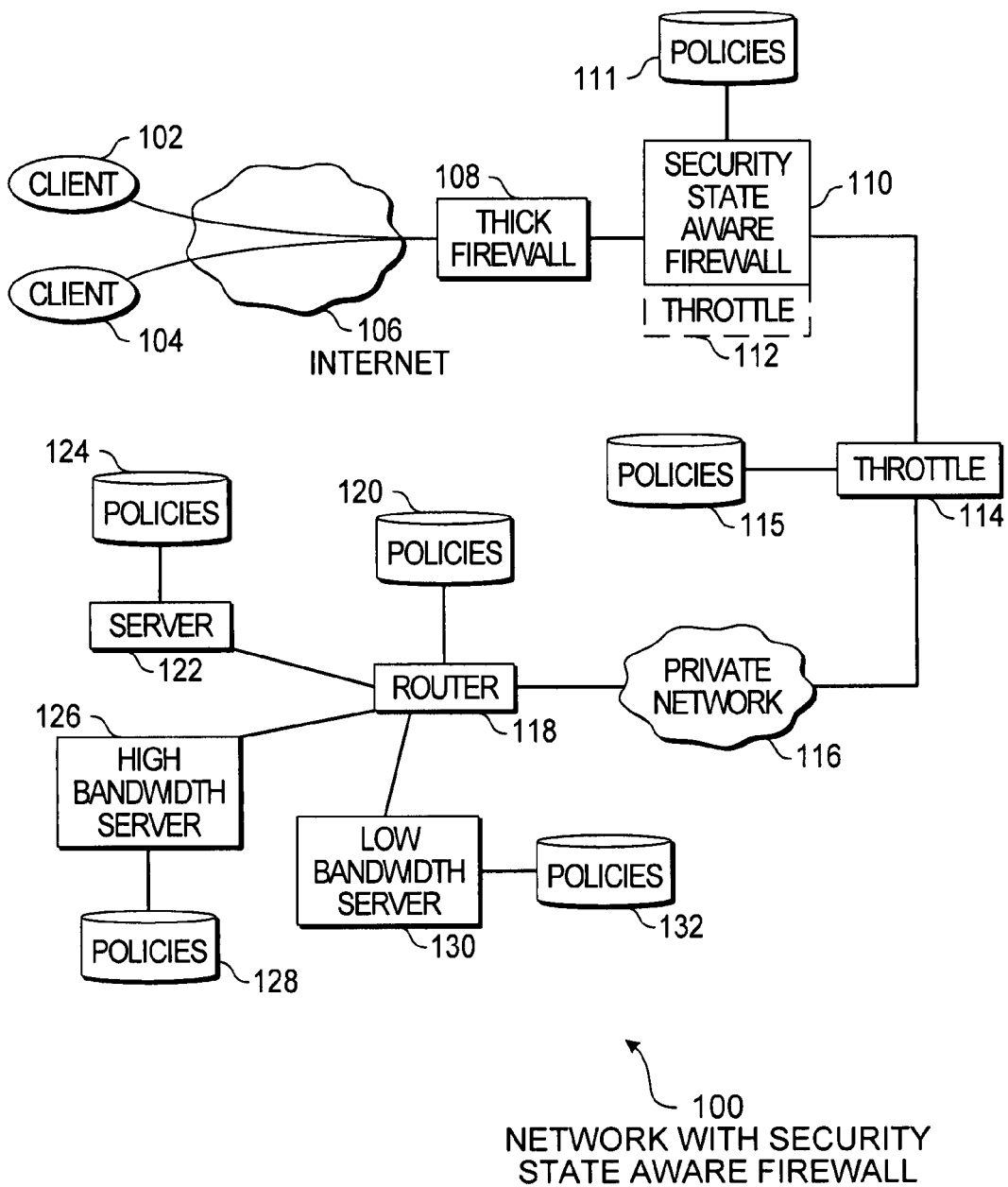
FIG. 1 is a diagram illustration of an embodiment showing a network with a security state aware firewall.

A thin firewall may analyze communication packets to determine a security classification for the session associated with the packets. When no secure session is associated with the packets, the packets may be dropped or handled at a low throughput, while packets that are associated with a secure session may have a high throughput.

The firewall may apply different policies to packets based on the security aspects of the communication session. The security aspects may be determined by several different mechanisms, including whether or not the packet is associated with an IP Security (IPsec) session or other Layer 3 or higher security mechanisms. In some cases, a policy may be established for packets originating from a specific network address or range of network addresses or packets having various other forms of authentication.

The firewall may throttle or limit the network traffic for packets that are not associated with a secure session. This action may be performed on a network pathway that would otherwise permit traffic and may be an effective guard against denial of service attacks or from other malicious network attacks.

In one use scenario, a request for a secure session may originate outside a network and pass through a firewall. Because the packet or packets that make up a request are initially sent without a secure session, those packets may pass through the firewall at a low transmission rate. When a device inside the firewall responds and a secure session is established, the future packets associated with the session may pass through the firewall at a much higher transmission rate.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a network with a security state aware firewall. Embodiment 100 is a simplified example used to highlight various characteristics, features, and uses of a security state aware firewall.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 100 is an example of a security state aware firewall used on an internet gateway for a private network. The security state aware firewall may be used alone or in conjunction with other devices to throttle or limit communications that are not performed within a secure or authenticated session. One method for limiting such communications may be to throttle or limit the throughput of unsecured communications.

By limiting the throughput for unsecured communications but allowing secured communications to flow at a higher throughput, limits may be placed on network traffic that may be malicious or otherwise not desired. For example, a denial of service attack may be thwarted by severely throttling unsecured communications but allowing secured communications to pass.

A secured or authenticated connection may be established using several different techniques and mechanisms. In some embodiments, an initial packet from a client device may be an unauthenticated and unsecured communication from outside a private or gated network, and the packet may be destined for a server device within the gated network. The server device may respond and, through various handshaking or authentication mechanisms, may establish a secure session with the client device.

During the initial query and handshaking phases of establishing a secure session, a security state aware firewall may permit the packets associated with the session to be transmitted at a low transmission rate, but after the secure session is established, the subsequent transmissions may be transmitted at a high transmission rate. For example, an unsecured or unauthenticated session may be transmitted at a low rate, such as 50 Mb/sec, but a secured session may be passed through at 1 Gb/sec.

In some embodiments, a security state aware firewall may apply policies for packets based on authentication of a client device. For example, a client device with a specific Media Access Control (MAC) address or having a specific network address or having a network address within a range of network addresses may have a policy applied to the communication session that is different from an unsecured and unauthenticated packet.

Some policy definitions may severely throttle unauthenticated or unsecured packets. In some policies, such packets may be transmitted at a rate of zero, which is to say the packets may be discarded and not permitted to be transmitted.

The client device 102 or 104 may send such a request over the internet 106 and through a thick firewall 108 to a security state aware firewall 110. A thick firewall 108 may refer to a firewall that may provide port filtering. Port filtering may refer to enabling specific ports for transmission while disabling others. In many applications, a thick firewall may enable a small set of ports while disabling all others.

A security state aware firewall 110 may analyze incoming packets and may apply policies 111 to the packets based on the security state of the communication session associated with the packets. The security state aware firewall 110 may perform a second level of firewall protection from port filtering by classifying packets that were permitted to pass through the thick firewall 108 and applying different policies to those packets. The security state aware firewall 110 may include a throttle 112 that may throttle or limit transmission speeds to packets based on the policy applied to the individual packets.

In many embodiments, the security state aware firewall 110 may perform analysis and apply policies to incoming packets but may ignore or pass through any outgoing packets. Other embodiments may analyze and apply policies to both incoming and outgoing packets.

In some embodiments, the security state aware firewall 110 may merely analyze packets and tag the packets for handling by other devices within the private network 114. The tags attached to packets may be used by downstream devices to enforce the policies. Such downstream devices may be a standalone throttle 114 that may have a set of implementation policies 115, the router 118 with a set of policies 120, or various servers each having policies.

The standalone throttle 114 may receive a packet that was analyzed and tagged by the security state aware firewall 110, read the tag, and apply one of the policies 115 to the packet. The policies 115 used by the standalone throttle 114 may, for example, may indicate a maximum transmission rate for a packet that is tagged with a particular tag. In some cases, the policies 115 may cause a packet to be dropped, while in other cases a policy may cause packets in an unsecured or unauthenticated session to be transmitted at a limited transmission rate.

The throttle 114 may be placed between the security state aware firewall 110 and the private network 116. In such an architecture, the security state aware firewall 110 and the throttle 114 may work together to minimize excess traffic within the private network 116.

In some embodiments, the functionality of the throttle 114 may be incorporated into the same device or logic of the security state aware firewall 110, as shown in the integral throttle 112. Some embodiments may likewise incorporate the functionality of the thick firewall 108 into the same device as the security state aware firewall 110.

The functionality of the security state aware firewall 110 may be incorporated into a gateway, server, router, or other network connected device. In such embodiments, the security state aware firewall 110 may have functionality defined in an executable code that causes the device on which the code executes to behave or perform in a particular manner.

Some networks may have an architecture where incoming packets are routed through the security state aware firewall 110 and are tagged per the policies 111 and other devices within the private network 116 may act upon the tagged packets in various manners.

For example, the router 118 may have a set of policies 120 that may define how packets with various tags are handled. The router 118 may perform some throttling functions similar to the throttle 114 wherein packets that are tagged with low priority or having no or low security attributes are transmitted at a reduced transmission rate. In some embodiments, the router 118 may route packets to different destinations based on the tags. For example, packets with no or low security attributes may be routed to a low bandwidth server 130 while packets with high security attributes may be routed to a high bandwidth server 122.

In some embodiments, the incoming packets may be routed to a server 122 that may apply policies 124 to handle incoming packets in various manners according to the tags and by extension, the security attributes of the session associated with the packets. The policies 122 may cause the server 122 to process authenticated or secure packets with a high priority while processing unauthenticated or packets associated with sessions having no or low authentication or security with low priority.

Different embodiments may use different sets of policies and may apply the policies using different devices across a network. For example, in one embodiment, a security state aware firewall 110 may have an integral throttle 112 in a single device. Such a device may be further incorporated into a thick firewall 108, router 118, or server 122.

When the security state aware firewall 110 is incorporated with an integral throttle 112, the combination may be capable of analyzing a packet, determining if a session associated with the packet is authenticated or secure, assigning a policy to the packet, and executing the policy by transmitting the packet at a maximum transmission rate for that policy. In such embodiments, the packets may or may not be tagged for further processing by downstream network devices.

In many embodiments, the security state aware firewall 110 may analyze and tag packets using a set of policies 111, and one or more downstream devices may use additional sets of policies to perform various functions based on the tags. For example a downstream throttle 114 may have policies 115 that may be applied to throttle the throughput of packets associated with unauthenticated or low security sessions.

In some embodiments, two or more downstream devices may apply policies to tagged packets. For example, a throttle 114 may limit the throughput of low priority packets while router 118 may apply policies 120 that may route low priority packets to a low bandwidth server 130. In some cases, the various servers 122, 126, and 130 may apply policies 124, 128, and 132, respectively to process low priority packets in one manner and high priority packets in a different manner.

In some embodiments, the security state aware firewall 110 may tag packets using policies 111 and one other downstream device may apply a policy based on the tag. Such a combination may include the firewall 110 and the throttle 114, the firewall 110 and the router 118, the firewall 110 and a server 122, or some other device in combination with the firewall 110.

Figure 2:
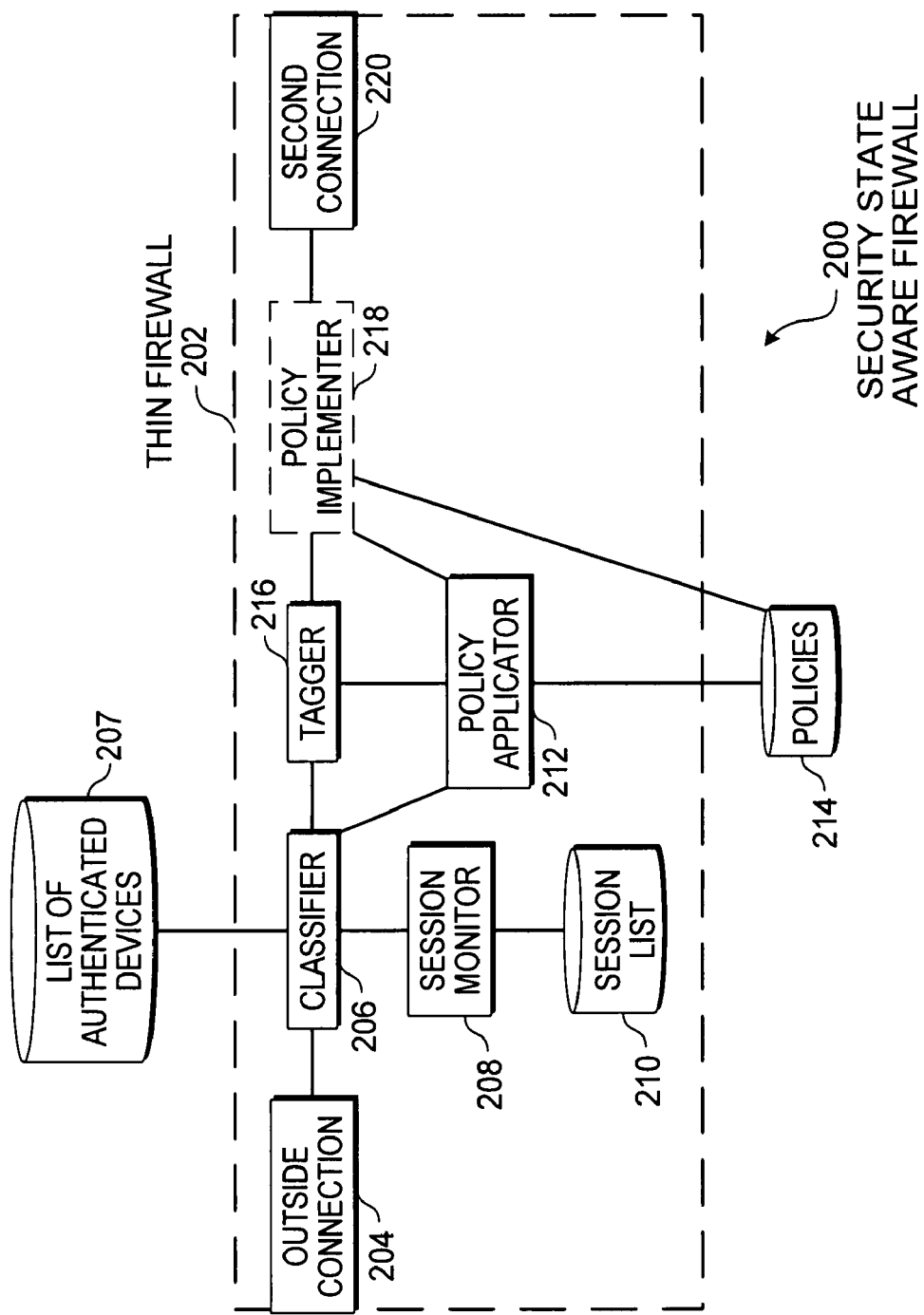
FIG. 2 is a diagram illustration of an embodiment showing a security state aware firewall.

FIG. 2 is a diagram illustration of an embodiment 200 showing a functional diagram of a security state aware firewall. Embodiment 200 is merely an example of one functional architecture that may be used for a security state aware firewall.

The diagram of FIG. 2 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

The thin firewall 202 may analyze incoming packets, determine the authentication level or security level of a session associated with the packets, and apply various policies to the packets. In some embodiments, the packets may be tagged for downstream devices or services to apply other policies. Some embodiments may also include a policy implementor that may perform some actions, such as throttling the throughput of some packets based on the applicable policy.

The thin firewall 202 may have an outside connection 204 that may receive packets from a wide area network such as the Internet. The outside connection 204 may be contrasted with a second connection 220 that may connect to a private or firewalled network. The thin firewall 202 may be designed to analyze packets being received on the outside connection 204 and transmit those packets on the second connection 220. Such an embodiment may or may not analyze packets that are received on the second connection 220. In many embodiments, packets received on the second connection 220 may be transmitted out the outside connection 204 without processing or analysis.

In many embodiments, the thin firewall 202 may be connected to a private network at the interface between the private network and a wide area network such as the Internet. The thin firewall 202 may be used to monitor incoming communications and may be helpful in thwarting various malicious attacks, such as a denial of service attack.

The classifier 206 may receive packets and determine if the packets are associated with an authenticated or secure session. In some embodiments, an incoming packet may be at least partially authenticated when the packet is transmitted by a known network address or a group of network addresses.

An authenticated or secure session may be established using many different mechanisms. For example, in the five-layer TCP/IP model as well as the seven layer OSI model, a secure session may be established within the network layer otherwise known as Layer 3. In both models, Layer 3 may respond to service requests from the transport layer (Layer 4) and issue service requests to the data link layer (Layer 2).

In Layer 3, various security mechanisms may be used to establish a secure session between two devices. One example is Internet Protocol Security otherwise known as IPsec. IPsec is a suite of protocols that may be used for secure communications by authenticating and/or encrypting each packet in a data stream. IPsec may include protocols for cryptographic key establishment.

Other security protocols may also be detected by the classifier 206, including protocols such as Transport Layer Security (TLS), Secure Sockets Layer (SSL), Secure Shell (SSH), and others. TLS, SSL, and SSH may operate on the application layer or Layer 5 of the TCP/IP model.

The classifier 206 may have a session monitor 208 that may monitor individual sessions and notify the classifier 206 when a session may change status. For example, an initial packet may be received on the outside connection 204 that may be part of a request for a secure or authenticated session. When the packet is received, the classifier 206 may analyze the packet and determine that no current session exists and that the session is unauthenticated or not secure. The session monitor 208 may monitor subsequent communications on the session and, after some handshaking or other preliminary communications, the session may be converted to a secure or authenticated session. When such a change occurs, the session monitor 208 may alert the classifier 206 so that subsequent communications on the session are classified as secure or authenticated. The session monitor 208 may store operational sessions in a session list 210.

The classifier 206 may assign various levels of authentication or security to an incoming packet. In some embodiments, a two level system may be used where a packet is either secure or not secure, while other embodiments may have several classification of a packet backed on various combinations of security attributes. For example, a packet may be partially authenticated if a packet contains a network address, MAC address, or other identifier that may correspond with a list of authenticated devices 207. In some embodiments, a packet may be partially authenticated if it contains an allowable network address but may be assigned a higher level of authentication if a recognized MAC address is also included.

The list of authenticated devices 207 may contain a list of network addresses, MAC addresses, or other identifiers that may be used in conjunction with various policies to enable a remote connection from a known device. In many such embodiments, policies may be in place that severely limit or even disallow communication requests from devices that are not listed in the list of authenticated devices 207.

A high classification may be assigned to those packets associated with a session that has a fully established IPsec or other Layer 3 security protocol. In many of such protocols, an authentication and/or encryption mechanism may be used to transmit information securely between two devices. In some embodiments, Layer 4 or 5 protocols, such as SSH, TLS, and SSL may be used to establish secure sessions as well.

The policy applicator 212 may receive a classification from the classifier 206 and apply various policies 214 to the packet based on the classification. In many embodiments, the policy applicator 212 may tag the packet using a tagger 216 according to the policies 214. A tag may include a designation that may be used by a downstream device to apply a corresponding policy.

In an example where two classifications are used, a packet may be tagged as a secure packet or as an unsecure packet. A downstream device may apply either a secure policy or unsecure policy to each packet according to the function of the device. For example, a downstream router may direct a packet to a specific server based on the tag, while a downstream throttle may adjust the data throughput of each packet based on the tag.

Some embodiments may include a policy implementer 218 that may apply policies 214 to the packets. In many embodiments, the policy implementer 218 may be a throttle that may allow packets to be transmitted at different throughput speeds based on the security or authentication classification associated with the packet. In such embodiments, packets may or may not be tagged using the tagger 216.

The policies 214 may contain rules or other descriptions of how various conditions may be handled. For example, a policy may be defined that allows maximum data throughput for packets associated with a secure session. A second policy may be defined that permits a limited throughput for those packets not associated with a secure session.

In the case where the thin firewall 202 does not include a policy implementer 218, a policy 214 used by the thin firewall 202 may merely state that packets associated with a secure session may be tagged using a first identifier and packets not associated with a secure session may be tagged with a second identifier. In such a case, a downstream device may interpret each identifier an apply a policy to the packet based on the tag.

Figure 3:
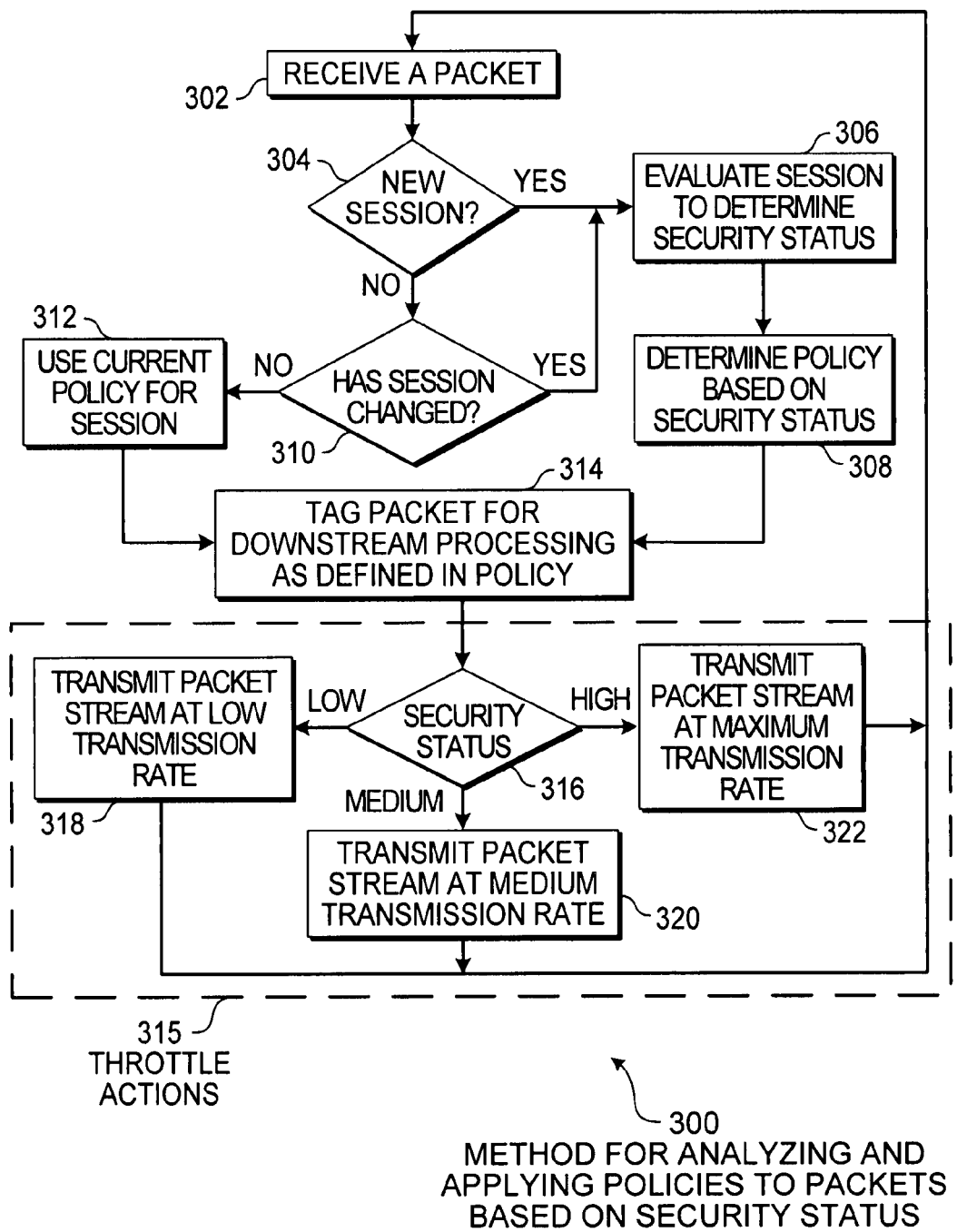
FIG. 3 is a flowchart illustration of an embodiment showing a method for analyzing and applying policies to packets based on security status.

FIG. 3 is a flowchart illustration of an embodiment 300 showing a method for analyzing and applying policies to packets based on security status. The embodiment 300 illustrates a simplified example of actions performed by a thin client and may illustrate some of the steps that may be performed in order to classify, tag, and apply policies to packets based on a security or authentication classification. Other embodiments may use different terminology or nomenclature and may include additional steps or may combine two or more steps into a single step. In other embodiments, some steps illustrated as serial may be performed in parallel and vice versa.

A packet may be received in block 302. If the packet is part of a new session in block 304, the session may be evaluated in block 306 to determine a security status. Similarly, if the session has changed in block 310, the session may be analyzed in block 306. When a security status is determined in block 306, a policy based on the status may be determined in block 308.

In many embodiments, a policy definition database or listing may be consulted in block 308 to determine an applicable policy. The policy definition database may be constructed in a manner that may enable an administrator or some other user or application to modify the policies from time to time.

If the current session is an existing session in block 304 and has not changed since last analysis in block 310, the current policy settings for the session may be used in block 312.

The packet may be tagged in block 314 for downstream processing. In some embodiments, the tagging may be used by one, two, or more different downstream devices to apply various policies to the packet. For example, a downstream device or service may include a throttle, a router, a switch, a hub, a server, access point, or some other network connection device or network end device.

Some embodiments may not tag packets as in block 314. In many cases, such embodiments may perform throttling or other actions on the packets.

An example of a throttling action may be illustrated in block 315.

If a packet has a security status in block 316 of low, the packet stream may be transmitted at a low transmission rate in block 318. A packet stream with a medium security status in block 316 may be transmitted at a medium transmission rate in block 302. Similarly, a packet stream with a high security status in block 316 may be transmitted at a maximum transmission rate in block 322.

Throughout this specification, references to individual packets may be synonymous or interchangeable with a packet stream, which may be many packets associated with a single communication session.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a first and second packet, said first packet being from a first communication session and said second packet being from a second communication session;
   classifying said first and second packet based on authentication of said first communication session and said second communication session, said first communication session being an unauthenticated session, said second communication session being an authenticated session;
   applying a first policy to said first packet and a second policy to said second packet based on said classifying, said first policy comprising applying a low priority to said first packet, said second policy comprising applying a high priority to said second packet;
   receiving a third packet, said third packet being from said first communication session, said first communication session having been changed to an authenticated session; and
   applying said second policy to said third packet.

2. The method of claim 1 further comprising:
   receiving a fourth packet, said fourth packet being from a third communication session, said third communication session being an authentication session having a higher level of authentication than said second communication session; and
   applying a third policy to said fourth packet.

3. The method of claim 1, said authenticated session comprising a Layer 3 security service.

4. The method of claim 3, said Layer 3 security service comprises IPsec.

5. The method of claim 1, said first policy comprising tagging said first packet with a first tag, said first tag being adapted to be read by a first device and apply said first policy.

6. The method of claim 1, said first policy comprising transmitting said first packet at a first transmission rate, said second policy comprising transmitting said second packet at a second transmission rate.

7. A device comprising:
   a first hardware connection that sends and receives packets;
   a classifier that determines a security status for an incoming packet; a policy applicator that applies adapted to apply a policy to said incoming packet based on said security status; and
   a policy implementor that allows said incoming packets with a first policy to pass at a first transmission rate and said incoming packets with a second policy to pass at a second transmission rate;
   said device that:
   receives a first and second packet, said first packet being from a first communication session and said second packet being from a second communication session;
   classifies said first and second packet based on authentication of said first communication session and said second communication session, said first communication session being an unauthenticated session, said second communication session being an authenticated session;
   applies a first policy to said first packet and a second policy to said second packet based on said classifying, said first policy comprising applying a low priority to said first packet, said second policy comprising applying a high priority to said second packet;
   receives a third packet, said third packet being from said first communication session, said first communication session having been changed to an authenticated session; and
   applies said second policy to said third packet.

8. The device of claim 7 further comprising a second connection adapted to send and receive packets.

9. The device of claim 7, said first transmission rate being a zero transmission rate.

10. The device of claim 7, said classifier being further adapted to determine a security status by evaluating the contents of said incoming packet.

11. The device of claim 10, said security status comprising not authenticated and authenticated.

12. The device of claim 11, said security status further comprising a first degree of authentication and a second degree of authentication.

13. The device of claim 12, said first degree of authentication comprising a Layer 3 security mechanism, and said second degree of authentication comprising a transmitting device network address.

14. The device of claim 7 further comprising a firewall adapted to block a plurality of ports.

15. The device of claim 7, said policy implementor further adapted to tag said incoming packet, said tag being selected based on said security status and adapted to be detected by a downstream device.

16. A method comprising:
    receiving a first packet on a first connection;
    determining that said first packet is associated with a first session, said first session not being a secure session;
    transmitting said first packet at a low transmission rate on a second connection;
    receiving a second packet on said first connection;
    determining that said second packet is associated with a second session, said second session being a secure session;
    transmitting said second packet at a high transmission rate on said second connection;
    receiving a third packet on said first connection;
    determining that said third packet is associated with said first session;
    determining that said first session has changed to a secure session; and
    transmitting said third packet at said high transmission rate on said second connection.

17. The method of claim 16, said secure session being a session with Layer 3 security.

18. The method of claim 17, said Layer 3 security comprising IPsec.

* * * * *